(12) United States Patent
Garg et al.

(10) Patent No.: US 8,903,381 B2
(45) Date of Patent: *Dec. 2, 2014

(54) INTER-CONTROLLER ROAM MANAGEMENT AND PREDICTION FOR VOICE COMMUNICATIONS

(71) Applicant: Microsoft Corporation, Redmond, WA (US)

(72) Inventors: Sumit Garg, Sunnyvale, CA (US); Ratul Mahajan, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/151,788

(22) Filed: Jan. 9, 2014

(65) Prior Publication Data

US 2014/0113623 A1    Apr. 24, 2014

Related U.S. Application Data

(63) Continuation of application No. 12/121,764, filed on May 15, 2008, now Pat. No. 8,630,637.

(51) Int. Cl.
```
H04W 4/00      (2009.01)
H04W 36/00     (2009.01)
H04W 12/06     (2009.01)
H04W 36/08     (2009.01)
H04W 36/10     (2009.01)
```

(52) U.S. Cl.
CPC ............. *H04W 36/08* (2013.01); *H04W 12/06* (2013.01); *H04W 36/10* (2013.01)
USPC ...................... 455/432.1; 455/435.1; 455/436

(58) Field of Classification Search
USPC .................... 370/494–495; 455/431.2–431.3, 455/433–434, 435.1–435.3, 436–444
See application file for complete search history.

(56) References Cited

U.S. PATENT DOCUMENTS

| | | |
|---|---|---|
| 7,236,477 B2 | 6/2007 | Emeott et al. |
| 7,275,157 B2 | 9/2007 | Cam Winget |
| 2004/0077335 A1 | 4/2004 | Lee et al. |

(Continued)

OTHER PUBLICATIONS

"Voice over Wireless LAN Solution Brief", 2007, Hewlett-Packard Development Company, dated Mar. 2007, retrieved from http://www.hp.com/rnd/pdfs/VoWLAN_solution_brief_US.pdf, 10 pages.

(Continued)

*Primary Examiner* — Patrick Edouard
*Assistant Examiner* — Matthew Genack
(74) *Attorney, Agent, or Firm* — Andrew Smith; Alin Corie; Micky Minhas

(57) ABSTRACT

A mobile device roaming architecture for use with a mobile device, such as a cellular phone, roaming a WiFi network. In instances where the mobile device attempts to roam to a different wireless access point managed by a controller using a different authentication key, the roam process can be excessively long such that the voice signal is disrupted or fails entirely. A detection component detects the roaming attempt, and a connection component switches the call back to the original access point controller before the call has a chance to drop. In this way, a connection is maintained to the network. A mitigation component performs an operation to maintain a connection to the call as the mobile device moves out of range of the original access point.

20 Claims, 10 Drawing Sheets

(56) References Cited

U.S. PATENT DOCUMENTS

| | | | | |
|---|---|---|---|---|
| 2005/0047381 | A1* | 3/2005 | Shukla et al. | 370/338 |
| 2005/0059400 | A1* | 3/2005 | Jagadeesan et al. | 455/436 |
| 2005/0208931 | A1* | 9/2005 | Hoffman | 455/417 |
| 2006/0062183 | A1 | 3/2006 | Forte et al. | |
| 2006/0229061 | A1 | 10/2006 | Chaplin | |
| 2006/0256763 | A1 | 11/2006 | Nguyen et al. | |
| 2007/0002833 | A1* | 1/2007 | Bajic | 370/352 |
| 2007/0053362 | A1 | 3/2007 | Garg | |
| 2007/0064647 | A1 | 3/2007 | Prasad | |
| 2007/0154017 | A1* | 7/2007 | Yun et al. | 380/270 |
| 2007/0280169 | A1* | 12/2007 | Cam Winget | 370/331 |
| 2008/0002653 | A1 | 1/2008 | Hung et al. | |

OTHER PUBLICATIONS

Sood et al., "Seamless Platform Mobility Across Wireless Networks", Intel Corporation, retrieved Jan. 29, 2008 from http://www.intel.com/technology/magazine/communications/mobility-on-wireless-0905.htm, 6 pages.

"Is Your WLAN Ready for Voice?", Critical Capabilities of the Cisco Unified Wireless Network Enabling Voice-over-Wireless-LAN service, 1992-2007, Cisco Systems, Inc., retrieved Jan. 29, 2008, from http://www.cisco.com/en/US/ solutions/collateral/ns340/ns394/ns348/net_implementation_white_paper0900aecd80472e80_ns772_Networking_Solutions_White_Paper.html, 10 pages.

Moustafa et al., "Secure and Fast Roaming in 802.11 WLANS", New Technologies, Mobility and Security, 2007, Springer Netherlands, retrieved Jan. 29, 2008, from http://www.springerlink.com/content/jr1u55l3r66h5442/, 2 pages.

"Cisco Unified Wireless Network Software Release 4.1", 1992-2007, Cisco Systems, Inc., retrieved Jan. 29, 2008, from http://www.ciscopowerednetwork.org/en/US/prod/collateral/wireless/ps5678/ps6521/prod_bulletin0900aecd8070f198_ps5861_Products_Bulletin.html,19 pages.

* cited by examiner

US 8,903,381 B2

INTER-CONTROLLER ROAM MANAGEMENT AND PREDICTION FOR VOICE COMMUNICATIONS

CROSS-REFERENCE TO RELATED APPLICATIONS

This application is a continuation of Non-Provisional patent application Ser. No. 12/121,764, entitled "INTER-CONTROLLER ROAM MANAGEMENT AND PREDICTION FOR VOICE COMMUNICATIONS", and filed May 15, 2008, now U.S. Pat. No. 8,630,637, issued Jan. 14, 2014.

BACKGROUND

Mobile communications such as associated with cell phones is frequently used by personnel located within an enterprise campus, typically using cellular carrier networks. However, many enterprise campuses are now blanketed with wireless packet infrastructures such as a wireless local area network (WLAN) implemented in accordance with the IEEE 802.11 standards. Rather than having personnel use a relatively expensive cellular network, it is desirable to employ mobile voice communications over the WLAN, so as to provide a "voice over WiFi" (VoWiFi) capability.

As with all mobile communications, it is desirable to maintain seamless, continuous service during roaming as mobile users move to different locations. However, WLANs typically have a "thin" configuration whereby multiple wireless access points (APs) perform essentially as transceivers and operate under the same controller which handles the actual processing functions.

Existing WiFi technologies do not enable mobile devices to roam among APs operating under different controllers due to length y authentication that can compromise the communications channel. In order to roam to APs under a different controller, an authentication process is performed to setup a secure channel between the mobile device and the different AP controller. This authentication can entail a time delay as long as one second. However, a latency of less than 50 milliseconds is necessary in order to maintain seamless voice communications. Excessive authentication delays can result in unexpected termination of the call or at least interruptions or annoying glitches in voice quality.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

To that end, a mobile device roaming architecture is disclosed that mitigates a disruption in or outright failure of the voice channel due to attempts by the mobile device to roam to an access point of a different controller. The roaming architecture can be embodied in a mobile voice communications terminal (e.g., a mobile phone, handset, or the like) or other mobile-capable systems to facilitate a positive user experience at least when roaming from one or more access points (APs) commonly associated with an original AP controller to an AP associated with a different AP controller over a wireless packet-switched communications infrastructure (e.g., a WLAN). This includes switching the wireless voice communications back to an AP of the original AP controller due to excessive authentication delays in the different controller that disrupt or cause failure of the communications.

A notification can be triggered to the device user and/or device components when a disruption and/or failure occurs in roaming to the different AP controller, for example, if voice communications characteristics at the first AP are below a predetermined threshold. Additionally, one or more mitigation operations can be initiated to maintain voice communications during this roaming attempt.

In another aspect, the architecture includes a prediction component that functions to predict if the mobile device will encounter a roaming situation across different controllers, and then perform operations to prepare for the roaming across different AP controllers. This can reduce the time used to authenticate to the different controller and/or alert the device (and the user) to take mitigation steps to reduce disruption in the voice channel by pausing, completing the call, or perhaps taking a different route to the user destination, for example.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
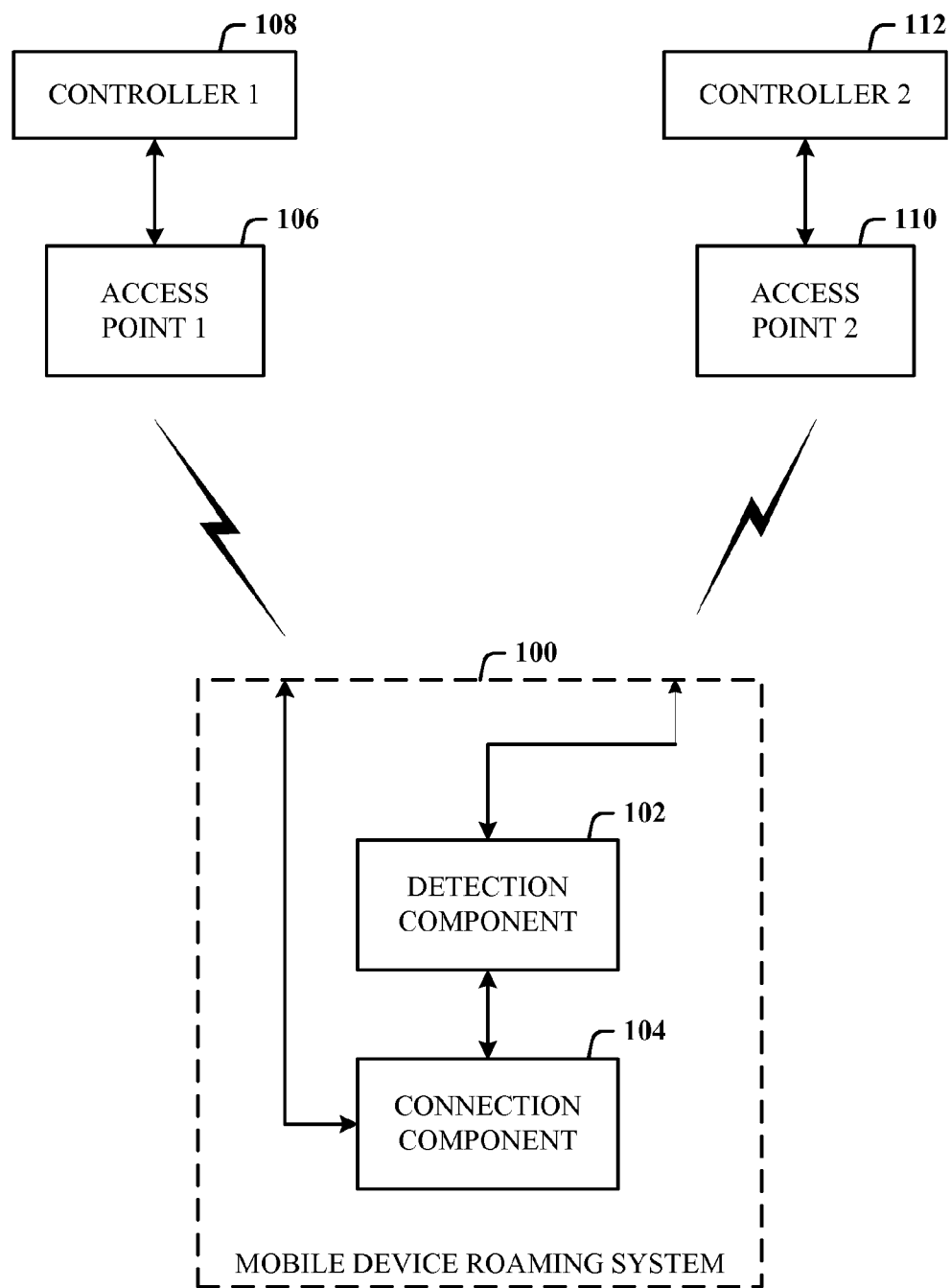
FIG. 1 illustrates an exemplary mobile device roaming system.

A mobile device roaming architecture is disclosed herewith for use with a mobile device, such as a cellular phone that seeks to maintain a voice channel in the presence of a roaming operation. This finds particular applicability in a WiFi regime where WiFi networks are provided (e.g., enterprise systems) for voice-over-WiFi (VoWiFi) communications. In instances where the mobile device attempts to roam to a different wireless access point (AP) managed by an AP controller using a different authentication key, the roam causes the call to be disrupted or dropped entirely due to excessive delays in the authentication process. In such a case, the roaming architecture detects the roaming attempt, and switches the call back to the original AP controller before the call has a chance to drop. In this way, a connection is maintained to the WiFi network. This is facilitated by the roaming architecture facilitating one or more mitigation operations to maintain a connection for the call as the mobile device moves out of range of the original AP.

Reference is now made to the drawings, wherein like reference numerals are used to refer to like elements throughout. In the following description, for purposes of explanation, numerous specific details are set forth in order to provide a thorough understanding thereof. It can be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

FIG. 1 illustrates a mobile device roaming system 100. This system 100 can be a component within a mobile device, such as a hand-held mobile terminal, or the like. The system 100 includes a detection component 102 and a connection component 104. The detection component 102 detects a switchover of wireless voice communications from a first access point 106 of a first controller 108 to a second access point 110 of a second controller 112. The first controller 108 and the second (or different) controller 112 are part of a wireless packet communications infrastructure, such as a wireless local area network (WLAN) so that VoWiFi can be performed.

During regular roaming between access points on the same controller (e.g., first controller 108), an authentication key is reused, thereby allowing a fast and seamless switchover of the voice signals that is transparent to the mobile user. However, in roaming from the first access point 106 to the second access point 110 on the second controller 112, a new authentication key is computed that introduces unacceptable delays (e.g., one second) in the switchover that degrade (e.g., partially or entirely) the voice connection. In this event, the secure channel setup fails early. Thus, the connection component 104 switches the wireless voice communications back to the first access point 106 of the first controller 108 upon failure of the wireless voice communications to occur via the different controller 112. In this way, communication can be maintained for a time since the mobile device already has the authentication key for the first controller 108.

Figure 2:
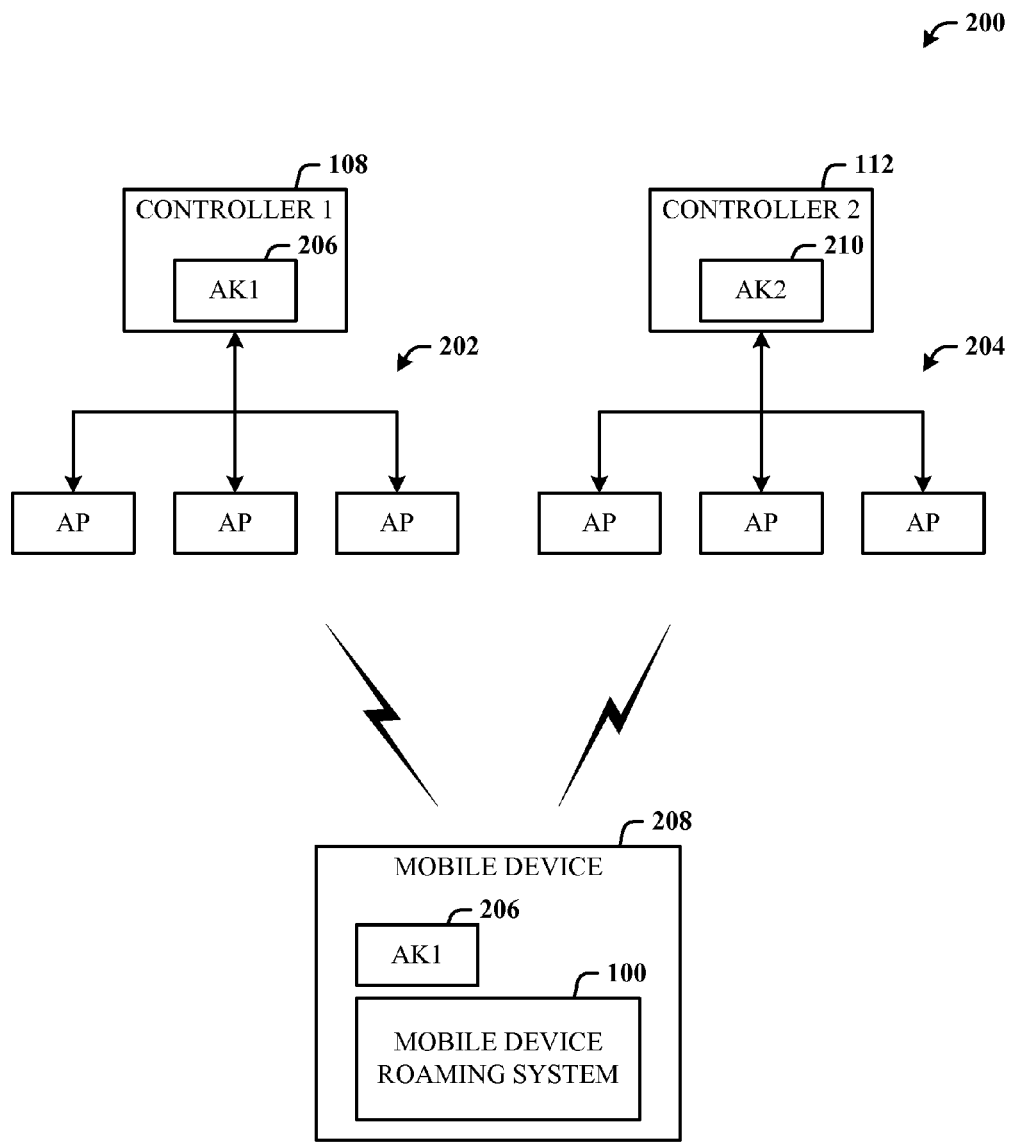
FIG. 2 illustrates an exemplary mobile device for roaming among access points operated by different wireless controllers.

FIG. 2 illustrates a wireless network 200 in which AP controllers each manage multiple APs. The first controller 108 manages a first set of wireless access points 202 and the second controller 112 manages a second set of associated access points 204. The first controller 108 employs a first authentication key (AK1) 206 used for authenticating a mobile device 208 to one or more of the access points 202. Similarly, the second controller 112 employs a second authentication key (AK2) 210 used for authenticating the mobile device 208 to one or more of the access points 204. The mobile device 208 can freely communicate with any of the access points 202 associated with the first controller 108 since the access points 202 share the common first authentication key 206. Similarly, the mobile device 208 can freely communicate with any of the access points 204 associated with the second controller 112 since the access points 204 share the common second authentication key 210.

As the user moves the device 208 throughout the radio area covered by the first controller 108, the mobile device 208 can enter the coverage provided by the second controller 112 and seek to associate with an access point of the second set of the access points 204. The mobile device roaming system 100 then checks the second authentication key 210 against the first authentication key 206 cached in the mobile device 208. Since the keys are different, and the switchover costly in terms of voice channel loss or degradation, the roaming system 100 facilitates switch back from the second controller 112 to the first controller 108 thereby maintaining voice communications via the first controller 108.

Figure 3:
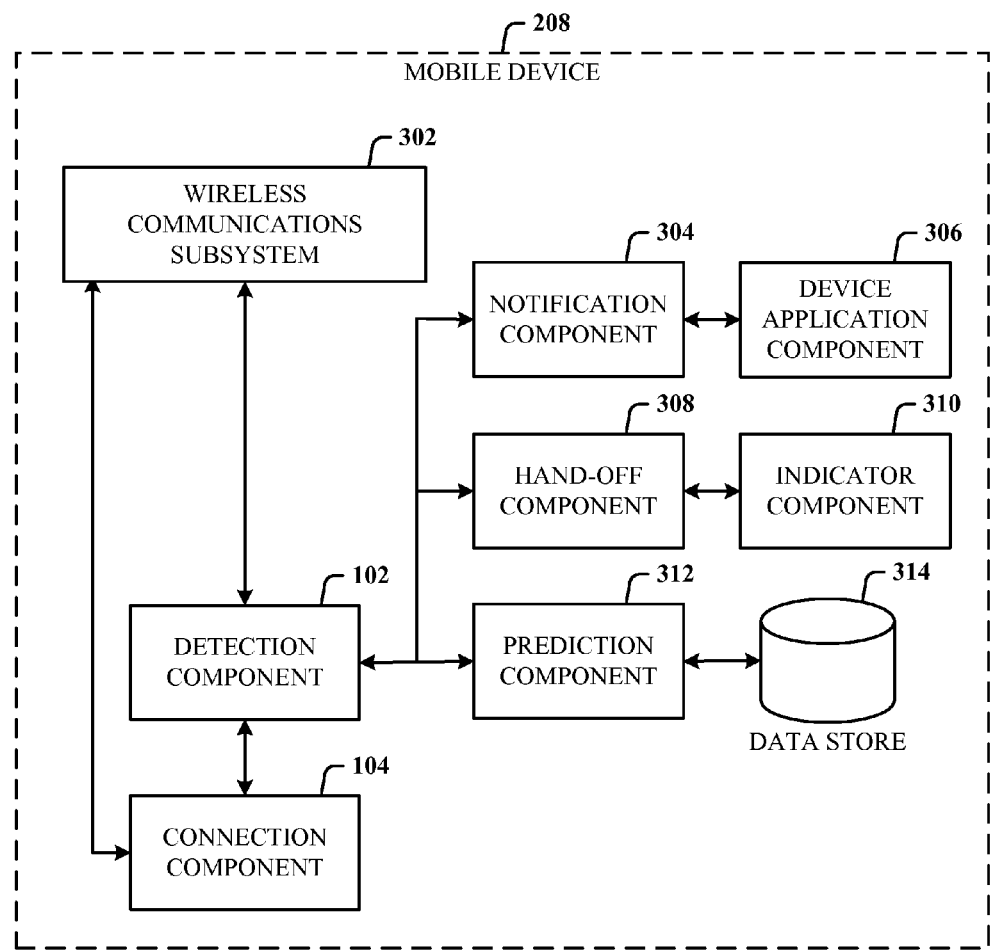
FIG. 3 illustrates an exemplary mobile device including a mobile device roaming system.

FIG. 3 illustrates an embodiment of a mobile device roaming system used in the wireless mobile device 208 having a detection component 102 and a connection component 104 in comportment with the embodiment as discussed hereinabove. The connection component 104 is in communication with a wireless communications subsystem 302 for exchanging voice communications with the wireless network (e.g., WiFi). The wireless communications subsystem 302 includes the hardware and/or software the supports wireless communications for short-range (e.g., Bluetooth, WiFi, WiMax, etc.) as well as long-range (e.g., cellular) communications.

As shown in FIG. 3, a notification component 304 is provided for notifying a device application component 306 that failure of the voice communications is imminent. Upon roaming failure and switching the mobile device 208 back to the first access point controller 108 as disclosed hereinabove, the characteristics of the voice communications signal received from the first controller 108 may now be below an acceptable threshold for maintaining a suitable connection, which can result in a connectivity glitch or loss entirely. A notification is then triggered to alert the device application component 306 (e.g., the operating system and/or other components or listeners) that the voice call can drop, since the device 208 is moving out of range of the first controller 108.

However, the mobile device 208 already initiated roaming a short period of time (e.g., several seconds) before the drop in voice characteristics, so the switch back to the first controller 108 allows a greater measure of alert time to the applications to take action before the call drops entirely. This notification is used by the system to allow a mitigation operation to be performed, so as to either transfer the call or alert the user (and other system entities) of degrading signal quality. These features can be provided within the mobile device 208 and do not require any modification to the infrastructure of the wireless network.

As also illustrated in FIG. 3, the device 208 can include a hand-off component 308 that cooperates with the connection component 104 for switching the mobile device 208 to an alternative network (e.g., a cellular network). If a cellular network, the mobile device 208 can begin to consume minutes on a cellular plan, for example. The hand-off component 308 can optionally function automatically such that the device user is not required interact in any way. Alternatively, the hand-off component 308 can be configured to prompt for user interaction before switching to the alternative network (e.g., cellular). In either instance, the user can be informed of the switchover by an indicator component 310 that provides indicators (e.g., visual and/or audible) incorporated into the mobile device 208.

The device 208 can additionally include a prediction component 312 for mapping a location distribution of access points over a commonly-travelled mobile communications area. In an enterprise campus environment, for example, mobile users frequently move in the same areas within the WLAN infrastructure thereby encountering the same controllers, and the same edge access points upon entering or leaving the network coverage area. For example, a user can typically make calls while moving from the user's office to a cafeteria in another campus building or location. This path can take the user through multiple access point controller networks and in range of selected access points of those controller networks. This pattern of use can be learned and stored for future prediction processing.

In other words, the prediction component 312 can track (or learn) user roaming behavior in geographical areas such as at work, traveling from work to home, home to work, roaming the work campus, and so on. Consequently, when leaving the user's office, for example, the user device 208 will typically make a first connection to access point A of Controller 1, followed by access point G of Controller 2, and finally, access point M of Controller 3. Knowing that this device travel will likely occur with some high degree of probability, and that inter-controller roam occurs when travelling along this path, the prediction component 312 can automatically predict that this route will commence again (at an approximate time), and thus, enable functionality that mitigates the effects on voice communications as the device 208 moves across the controller networks. In a more robust implementation, the prediction component 312 (and/or associated algorithms) can access a user calendar for appointments and appointment locations to more accurately predict the path taken by the user to get to that location and the associated WiFi access points along that path.

In other words, the prediction component 312 can optionally include one or more algorithms that associate signal characteristics from various access points with routes of travel around the physical area of the network. In this way, the prediction component 312 can learn the approaches to various coverage perimeters (access points) and predict a change (e.g., drop) of voice characteristics, thereby allowing for early notification to the mobile device 208 (and device user) to allow a mitigation operation to be performed.

Where the device 208 includes such capability, the prediction component 312 can correlate specific recurrent distributions of signal characteristics with geographic position information by way of an onboard geolocation component (e.g., GPS (global positioning system). This can also be performed using signal strength or by triangulating position from the various access points with range of each position.

The various access points can be distinguished by a unique address and the mobile device 208 can thereby recognize the access points. The information gleaned by the prediction component 312 can be retained in a data store 314 and referenced by the algorithm(s) to create a map of location distributions for the access points in the network over a mobile communications area commonly travelled by the user.

Figure 4:
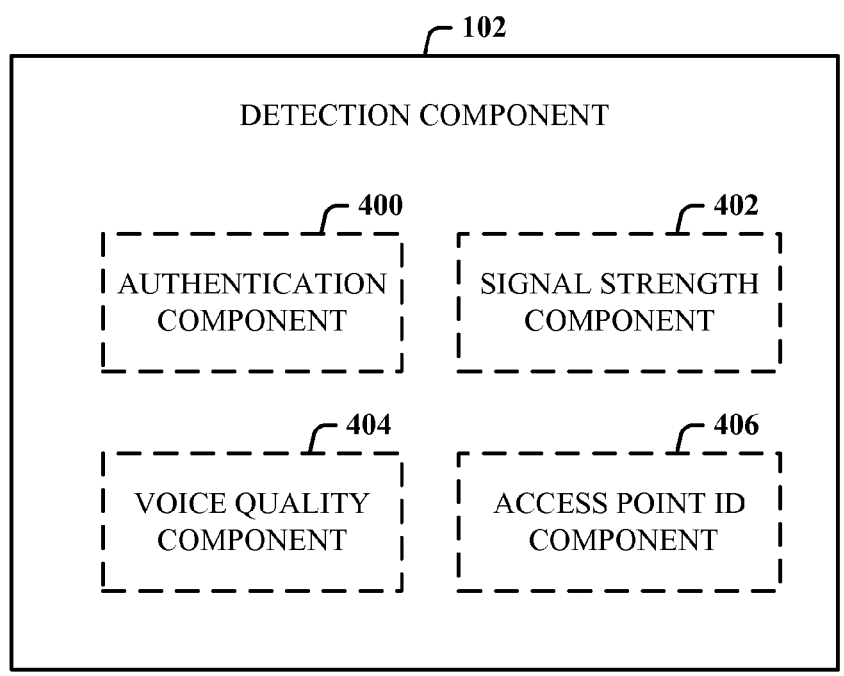
FIG. 4 illustrates exemplary aspects of a detection component as used with a mobile device roaming system.

FIG. 4 illustrates components that can be optionally incorporated into the detection component 102. The detection component 102 can include an authentication component 400 for detecting an initiated authentication to an access point associated with a different authentication key.

In an authentication process, a secure channel is established after an access point has been identified to which the mobile device 208 will roam, in accordance with current protocols under IEEE 802.11i, which broadly includes 802.1x protocols for authentication to a RADIUS (remote authentication dial-in user service) server and a four-way handshake to establish a key (e.g., a pairwise transient key (PTK)) that authorizes an exchange of data traffic. In a first stage, 802.1x authentication produces a pairwise master key (PMK), which is a time-consuming process that introduces significant delays. WPA2 (WiFi protected access 2, for securing WiFi networks) achieves fast handoff between access points operating under the same controller by using opportunistic pairwise master key (OPMK) caching. In this optimization for networks that use a controller as an 802.1x authenticator, the PMK can be computed for reuse when roaming between access points attached to the same controller.

However, if the mobile device 208 begins to roam to a different controller, a new authentication is initiated if the system (the detection component 102) detects that the cached PMK is not valid. Since the PMK is recomputed, which introduces delays, the authentication component 400 detects that the cached PMK is not valid, and rather than continuing the authentication process, alerts the connection component 104, which switches back to the previous access point under the original controller.

The detection component 102 can also include a signal strength component 402 for detecting a low signal strength threshold of the access point. In this instance, the user moves out of radio range of the access point resulting in a signal gain that drops too low to maintain voice communications. The signal strength component 402 then alerts the connection component 104 and switches the mobile device 208 back to the previous access point.

The detection component 102 can also include a voice quality component 404 for determining whether packets arrive at intervals sufficient to maintain voice communications. In order to maintain a sufficient quality of voice communications, a packet should be received no more than 50 milliseconds from the previous packet. However, the system can encounter "chatter" in which packets are received at irregular intervals (e.g., 100 milliseconds apart followed by 10 milliseconds apart, etc.). This can indicate an unacceptable degree of background radiation (e.g., due to the presence of a nearby microwave oven) at the operating frequency. The voice quality component 404 detects chatter and facilitates switch back of the mobile device 208 to the previous access point.

The detection component 102 can also include an access point identification (ID) component 406 for identifying the one or more access points of a controller. Each controller and/or access point controlled thereby broadcasts a unique ID so as to enable the mobile device 208 to identify the controller and family of access points managed by that controller. This allows the access point ID component 406 to distinguish between controllers.

Figure 5:
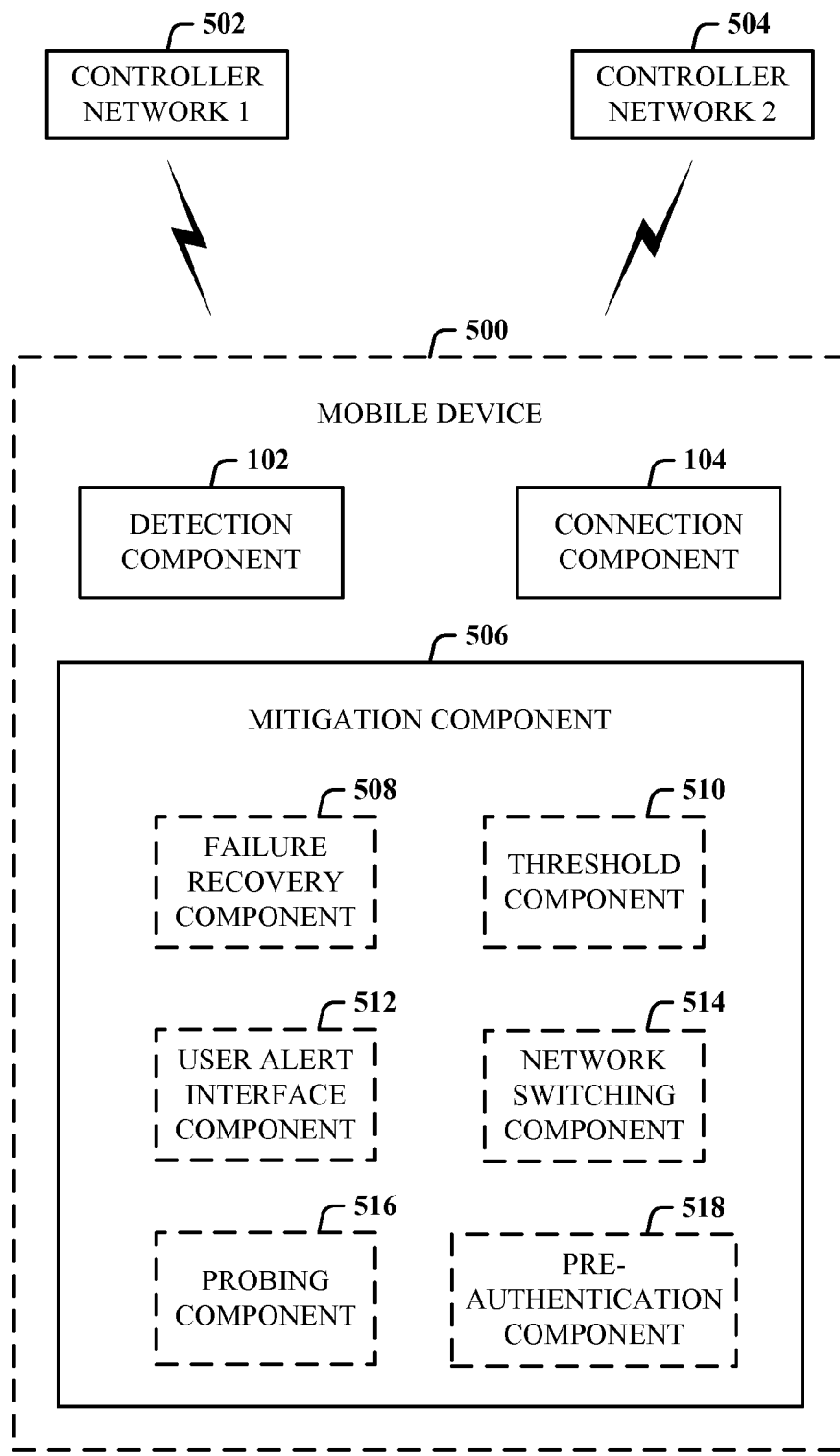
FIG. 5 illustrates an exemplary mobile voice communications system.

FIG. 5 illustrates an alternate embodiment of a mobile device 500 that employs mitigation functionality for maintaining voice communications. The mobile device 500 (e.g., cell phone, PDA, etc.) is provided for exchanging voice communications over a first controller network 502 (includes a controller and one or more access points) or a second controller network 504 (includes a controller and one or more access points) connected to a wireless packet communications infrastructure (not shown), such as a WLAN. The detection component 102 is provided for detecting a roam attempt between controllers, for example, the first controller network 502 to the second controller network 504. As before, the connection component 104 provides the switching functionality to switch the wireless voice communications at least from the second controller network 504 back to the first controller network 502.

A mitigation component 506 of the mobile device 500 is provided for maintaining voice communications in response to a failure of roaming to the second controller network 504. The mitigation component 506 provides mitigation functions that operate to provide a more positive user experience by, for example, notifying the user of a potential signal loss, switching networks, and so on.

In one aspect, the mitigation component 506 can include a failure recovery component 508 for restoring the wireless voice communications to the first controller network 502 upon failure of the roaming to the second controller network 504.

A threshold component 510 can be provided that cooperates with the failure recovery component 508 to detect a predetermined threshold of voice communications characteristics upon restoring wireless voice communications to the first controller network 502 and triggering a notification in response thereto. The predetermined threshold can represent parameters or combination thereof associated with the quality of service of the voice communications. It is contemplated that the predetermined threshold can include a signal strength threshold for measuring gain of the wireless signal. The predetermined threshold can also include an indication of "chatter," or a packet arrival interval insufficient to maintain voice communications.

Alternatively or in combination therewith, a user alert interface component 512 can be provided for soliciting user intervention. This can be in the form of an actuating component for a user alert indicator, which can be audible or visible to alert the user to an imminent interruption to the voice communications (e.g., a call). An interface can be provided such as a button that can be selected to allow the user to further select one or more options for maintaining voice communications.

The mitigation component 506 can also include a cellular switching component 514 for switching the voice communications to a cellular network. This can be initiated automatically or manually in response to an action of the user. Additionally or alternatively, a probing component 516 can be employed for probing other access points attached to the same controller. The probing component 516 can compare voice communications characteristics of the other available access points and discover a more suitable connection for maintaining voice communications.

It is also contemplated that the mitigation component 506 can include a pre-authentication component 518 that performs a pre-authentication process with the second controller network 504 while attached to the first controller network 502. In this way, the mobile device 500 can authenticate and roam to the second controller network 504 without 802.1x authentication delay.

Figure 6:
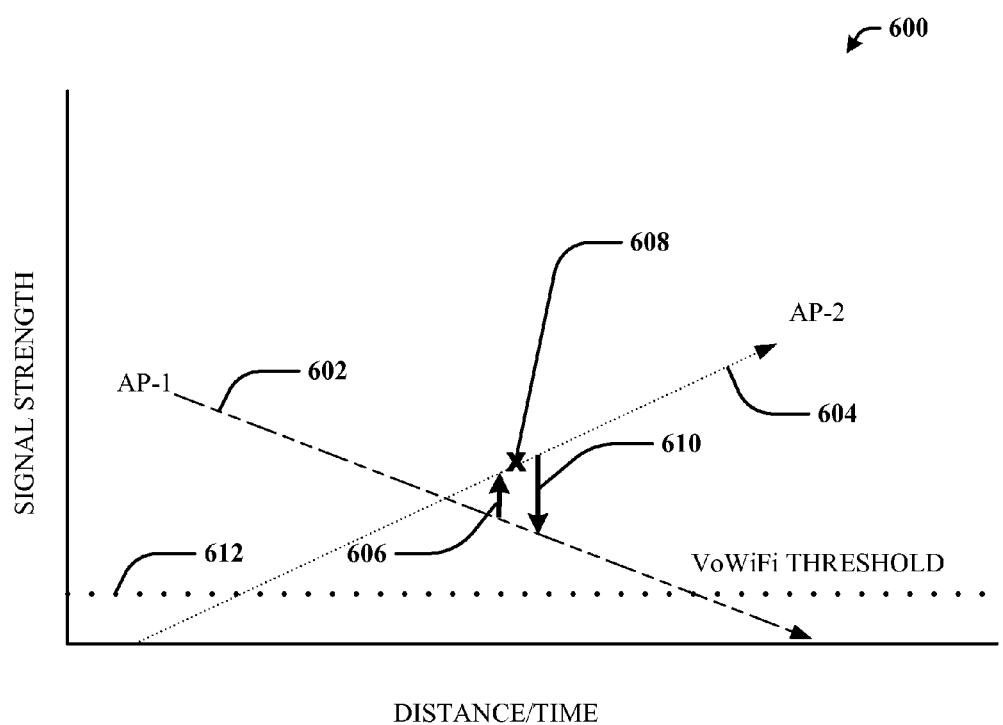
FIG. 6 illustrates graphically an exemplary roaming between two controller systems showing varying signal characteristics as a function of time and distance.

FIG. 6 illustrates a graph 600 that represents one technique for determining when to initiate switch back for a mobile device roaming between controller networks. Here, signal strength between a first access point (AP-1) and a second access point (AP-2). The graph 600 is simplified and assumes a linear degradation of signal strength varying as a function of time and distance as the mobile device moves away from access point AP-1. However, in a real system, the voice characteristics can vary widely for a variety of contributing factors and degradation can be represented by a non-linear curve indicating a smoothed average of multiple discrete measurements. The graph 600 shows a VoWiFi (voice over WiFi) threshold which represents the minimum signal strength that can support an active voice call.

As the user device moves to the right in the graph 600 while connected to access point AP-1, the signal strength 602 drop below the threshold and the mobile device initiates a roam. The device driver probes for access points in the vicinity on different channels. Based on the signal strength 604 of access point AP-2, the driver can decide to roam (represented by arrow 606) to access point AP-2, the associated signal strength represented as line 604. When the device driver causes a communications hop to the line 604, if the cached PMK is not usable on the access point AP-2, the device driver checks if a voice call is active.

If a voice call is active, the driver looks up a list of "fallback APs," (the point of decision 608 to switch back designated by the "X"). Note that in this example, the list is assumed to only include access point AP-2. Thus, the device driver will associate 610 back to AP-1. This re-association with access point AP-1 will be quick as the device already has the PMK cached for access point AP-1. Theoretically, this switch back can be achieved in 10 ms. Then, since signal strength of access point AP-1 is below the threshold 612 to trigger a roam, an alert notification can be triggered. Since the signal strength (and other voice characteristics) of access point AP-1 are still above the minimum threshold, the voice call can proceed while the application operating system consumes the alert to perform a mitigation operation.

In an exemplary implementation, the architecture can be realized by a number of particular interactive software components, including a voice application, a WiFi driver, and a network stack/operating system. The voice application can be used to issue system commands to indicate to the operating system and WiFi driver whether or not a VoWiFi call is active on the mobile device. These commands can be implemented with object identifiers (OIDs) such as OID_VoiceCallActive and OID_VoiceCallTerminated. The WiFi driver consumes the OIDs to indicate whether a voice call is active. If the OIDs are absent, the WiFi driver can rely on quality-of-service (QoS) markers on the data traffic, since QoS markers of voice traffic can indicate an active voice call.

The WiFi driver can maintain a candidate list of access points to fall back to in the event a roam fails. This list at least includes the last connected access point. This list can contain access points that the mobile device was associated with at some point in time and whose signal strength and other characteristics are above a predetermined threshold. The WiFi driver can also issue notifications in the form of an OID, such as OID_WiFiConnectivityAlert. The networking stack/operating system passes OIDs set by the voice application to the WiFi driver, and passes the notification from the driver up to the applications.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
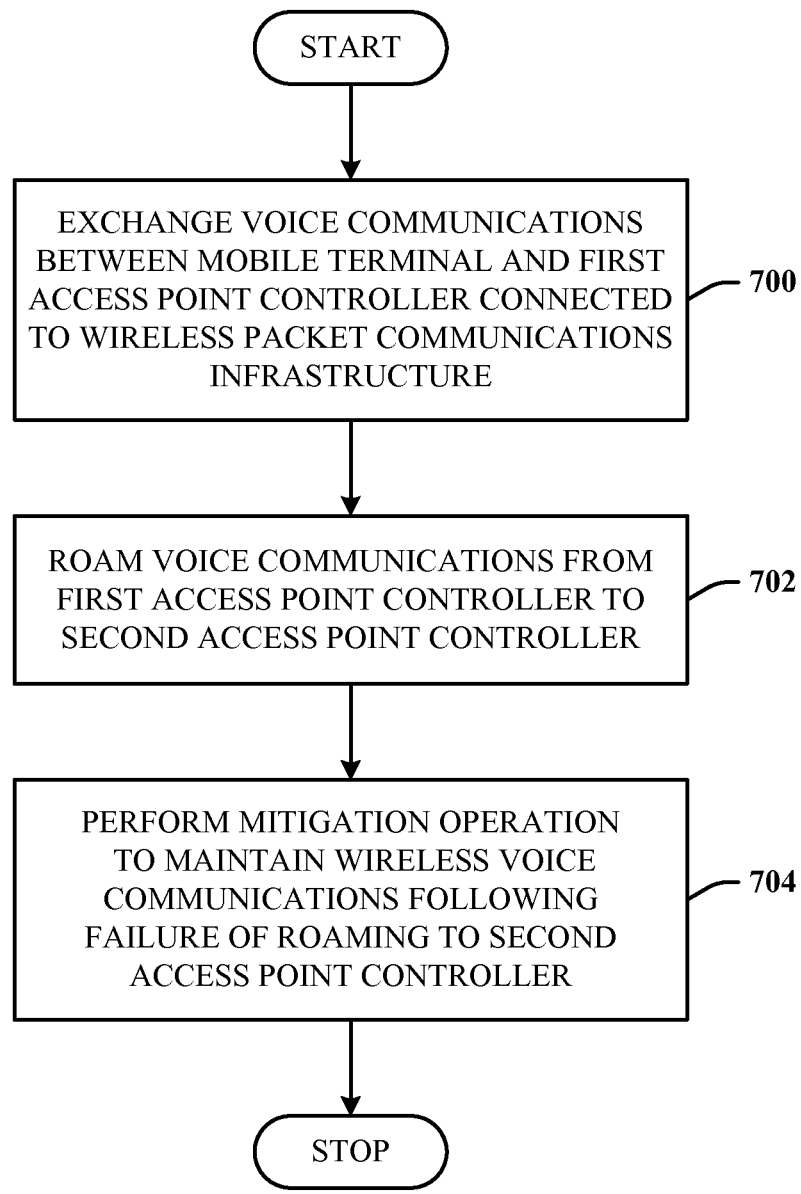
FIG. 7 illustrates an exemplary wireless communications method.

FIG. 7 illustrates a method of wireless communication. At 700, an exchange of voice communications establish between a mobile terminal and a first access point controller connected to a wireless packet communications infrastructure. At 702, the voice communications is roamed from the first access point controller to a second access point controller. At 704, a mitigation operation is performed to maintain the wireless voice communications following a failure of the roaming to the second access point controller system.

Figure 8:
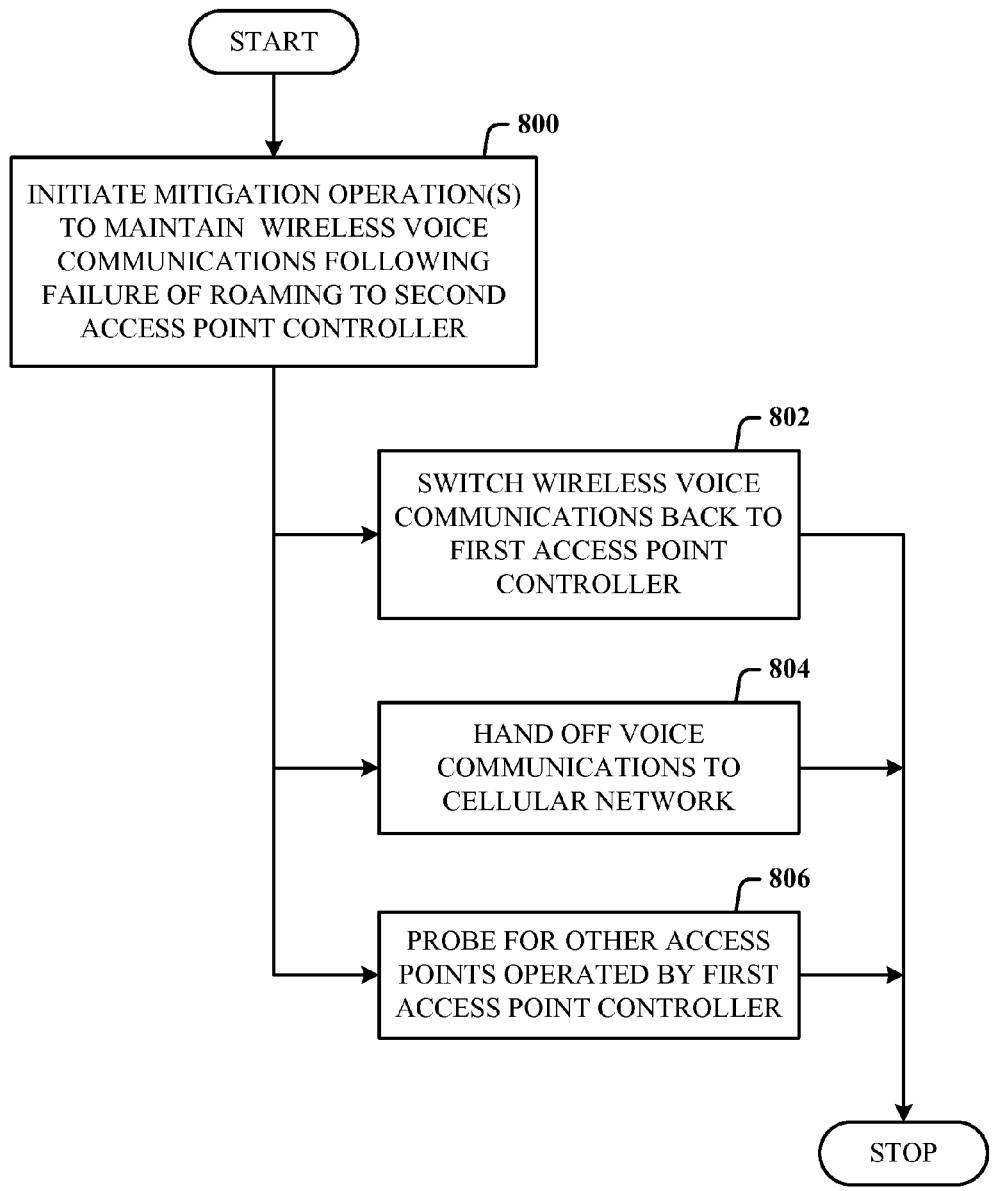
FIG. 8 illustrates exemplary aspects of a mitigation operation in a wireless communications method.

FIG. 8 illustrates alternative embodiments for performing the mitigation operation, as disclosed hereinabove. At 802, performing the mitigation operation can include switching the wireless voice communications back to the first access point controller system. At 804, performing the mitigation operation can include handing off the voice communications to a cellular network. At 806, performing the mitigation operation comprises probing for other access points operated by the first access point controller system.

The aforementioned method can also include other acts performed alternatively or in conjunction with those disclosed hereinabove. In one aspect, the performing of the mitigation operation is preceded by detecting a signal threshold indicative of characteristics insufficient to maintain voice communications. This threshold detecting can include detecting low signal strength. Threshold detecting can also include detecting irregular packet arrival interval.

Further, the roaming performed in the aforementioned method can also include performing a pre-authenticating with the second access point controller system while attached to the first access point controller system, so as to roam without authentication delay. Additionally, mapping of a location distribution of access points can be performed over a commonly-travelled mobile communications area.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
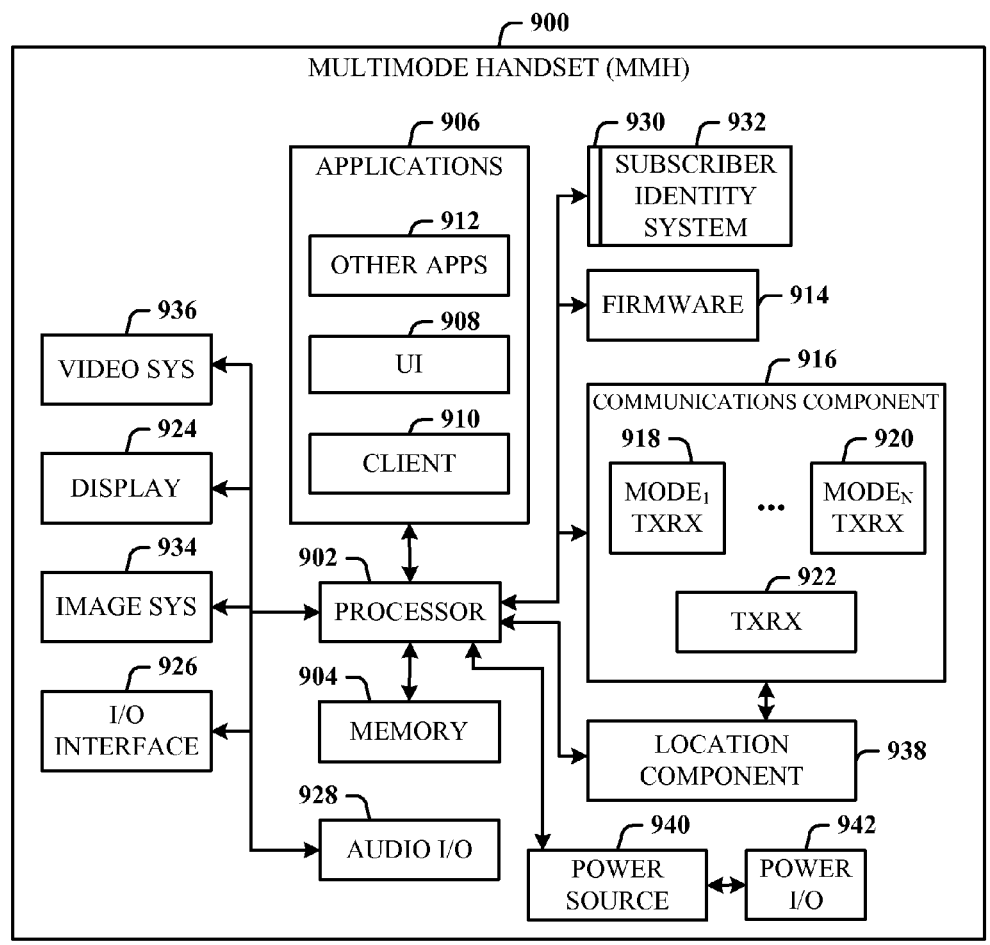
FIG. 9 illustrates an exemplary multi-mode handset used with a mobile voice communications system.

FIG. 9 illustrates a schematic block diagram of an exemplary multimode handset 900 in accordance with an innovative aspect. In order to provide additional context for various aspects thereof, FIG. 9 and the following discussion are intended to provide a brief, general description of a suitable environment in which the various aspects of the novel embodiment can be implemented. While the description includes a general context of computer-executable instructions, those skilled in the art will recognize that the novel embodiment also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The handset 900 (e.g., a cell phone) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the handset systems.

The handset 900 includes a processor 902 for controlling and processing onboard operations and functions. A memory 904 interfaces to the processor 902 for the storage of data and one or more applications 906 (e.g., a video player software, user feedback component software, etc.). The applications 906 can also include a user interface (UI) application 908 that operates with a client 910 (e.g., operating system) to facilitate user interaction with handset functionality and data, for example, answering/initiating calls, entering/deleting data, configuring settings, address book manipulation, multimode interaction, etc. The applications 906 can include other applications 912 that came installed with the handset 900 and/or can be installed as add-ons or plug-ins to the client 910 and/or UI 908, for example, or for other purposes (e.g., processor, firmware, etc.).

Additionally, the applications 906 can include the mobile device roaming system 100, the detection component 102, and the connection component 104 of FIG. 1. The applications 906 can also include the notification component 304, device application component 306, the hand-off component 308, and the prediction component 312 of FIG. 3. Additionally, the applications 906 can include the components that cooperate with the detection component 102 as shown in FIG. 4, namely, the authentication component 400, the signal strength component 402, the voice quality component 404, and the access point identification component 406. The applications 906 can also include the components of the embodiment of FIG. 5, including the mitigation component 506, the failure recovery component 508, the threshold component 510, the user alert interface component 512, the network (e.g., cellular) switching component 514, the probing component 516, and the pre-authentication component 518.

The other applications 912 can include voice recognition of predetermined voice commands that facilitate user control, call voice processing, voice recording, messaging, e-mail processing, video processing, image processing, music play, as well as subsystems or components described infra. Some of the applications 906 can be stored in the memory 904 and/or in a firmware 914, and executed by the processor 902 from either or both the memory 904 or/and the firmware 914. The firmware 914 can also store code for execution in power-up initialization and control during normal operation of the handset 900.

A communications component 916 can interface to the processor 902 to facilitate wired/wireless communications with external systems, for example, cellular networks, VoIP (voice-over-IP) networks, local wireless networks or personal wireless networks such as Wi-Fi, Wi-Max, and so on. Here, the communications component 916 can also include a multimode communications subsystem for providing cellular communications via different cellular technologies. For example, a first cellular transceiver 918 (e.g., GSM) can be one mode and an Nth transceiver 920 can provide cellular communications via an Nth cellular network (e.g., UMTS), where N is a positive integer. The communications component 916 can also include a transceiver 922 for unlicensed communications (e.g., Wi-Fi, Wi-Max, Bluetooth, etc.) for corresponding communications. The communications component 916 can also facilitate communications reception from terrestrial radio networks (e.g., broadcast), digital satellite radio networks, and Internet-based radio services networks.

The handset 900 can process IP data traffic via the communications component 916 to accommodate IP traffic from an IP network such as, for example, the Internet, a corporate intranet, a home broadband network, a personal area network, etc., via an ISP or broadband cable provider. Thus, VoIP traffic can be utilized by the handset 900 and IP-based multimedia content can be received in an encoded and/or decoded format.

The handset 900 includes a display 924 for displaying multimedia that include text, images, video, telephony functions (e.g., a Caller ID function), setup functions, menus, etc. The display 924 can also accommodate the presentation of multimedia content (e.g., music metadata, messages, wallpaper, graphics, etc.).

An input/output (I/O) interface 926 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 926 can be utilized for updating and/or troubleshooting the handset 900, for example.

Audio capabilities can be provided via an audio I/O component 928, which can include a speaker for the output of audio signals related to, for example, indication that the user pressed the proper key or key combination to initiate the user feedback signal, call signals, music, etc. The audio I/O component 928 also facilitates the input of audio signals via a microphone to record data and/or telephony voice data, and for inputting voice signals for telephone conversations.

The handset 900 can include a slot interface 930 for accommodating a subscriber identity system 932 that can accommodate a SIM or universal SIM (USIM), and interfacing the subscriber identity system 932 with the processor 902. However, it is to be appreciated that the subscriber identity system 932 can be manufactured into the handset 900, and updated by downloading data and software thereinto.

An image capture and processing system 934 (e.g., a camera) can be provided for decoding encoded image content. Additionally, as indicated, photos can be obtained via an associated image capture subsystem of the image system 934. The handset 900 can also include a video component 936 for processing video content received and, for recording and transmitting video content.

Optionally, a geolocation component 938 (e.g., GPS-global positioning system) facilitates receiving geolocation signals (e.g., from satellites via the communications component 916) that define the location of the handset 900. Alternatively, or in combination therewith, the geolocation component 938 can facilitate triangulation processing for locating the handset 900.

The handset 900 also includes a power source 940 in the form of batteries and/or an AC power subsystem, which power source 940 can interface to an external power system or charging equipment (not shown) via a power I/O component 942.

Figure 10:
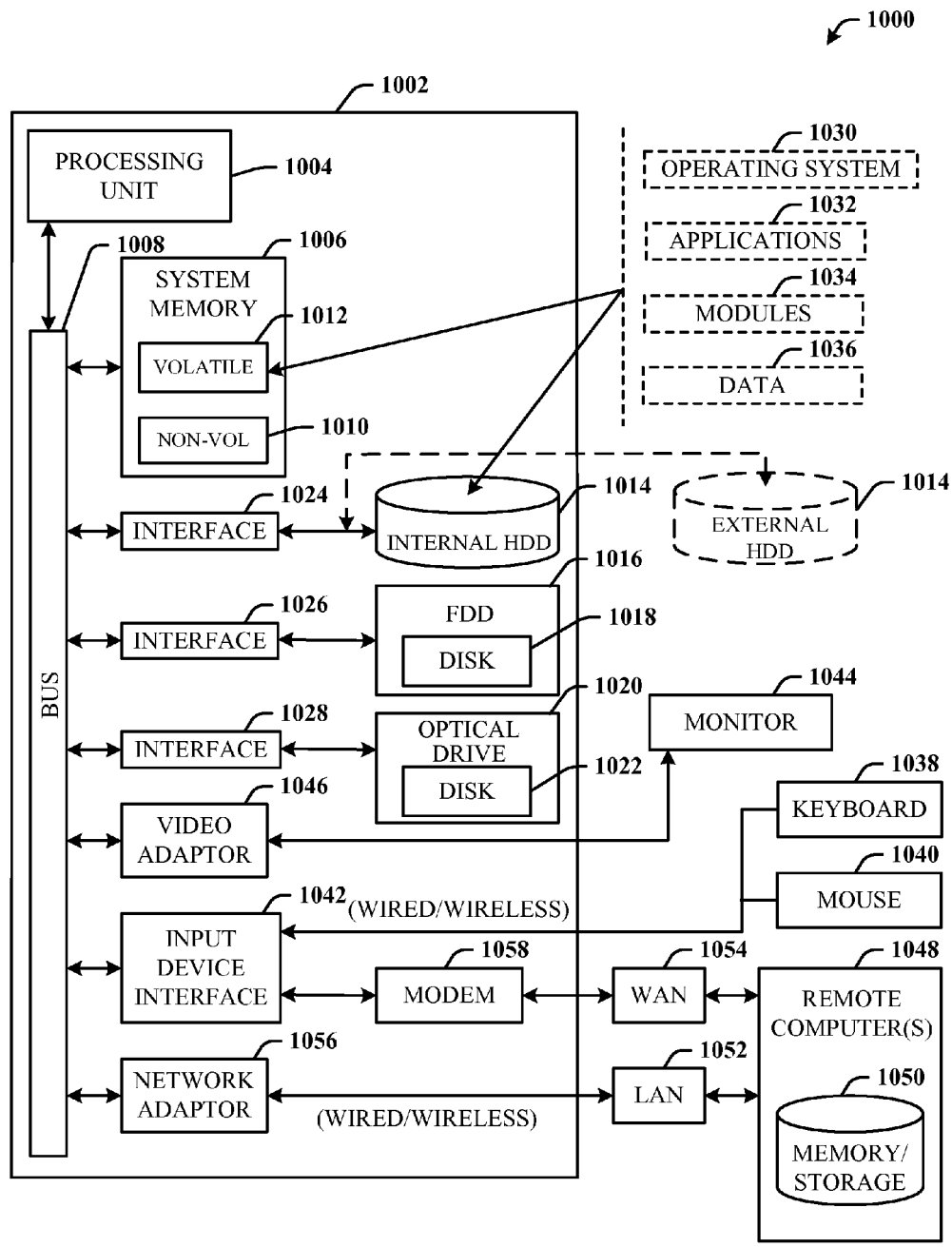
FIG. 10 illustrates an exemplary computer system operable to execute wireless voice communications.

Referring now to FIG. 10, there is illustrated a block diagram of a computing system 1000 operable to execute the mobile device roaming system 100 of FIG. 1 in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002 having a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 can include non-volatile memory (NON-VOL) 1010 and/or volatile memory 1012 (e.g., random access memory (RAM)). A basic input/output system (BIOS) can be stored in the non-volatile memory 1010 (e.g., ROM, EPROM, EEPROM, etc.), which BIOS are the basic routines that help to transfer information between elements within the computer 1002, such as during start-up. The volatile memory 1012 can also include a high-speed RAM such as static RAM for caching data.

The computer 1002 further includes an internal hard disk drive (HDD) 1014 (e.g., EIDE, SATA), which internal HDD

1014 may also be configured for external use in a suitable chassis, a magnetic floppy disk drive (FDD) 1016, (e.g., to read from or write to a removable diskette 1018) and an optical disk drive 1020, (e.g., reading a CD-ROM disk 2322 or, to read from or write to other high capacity optical media such as a DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media can contain computer-executable instructions for performing novel methods of the disclosed architecture.

A number of program modules can be stored in the drives and volatile memory 1012, including an operating system 1030, one or more application programs 1032, other program modules 1034, and program data 1036. All or portions of the operating system, applications, modules, and/or data can also be cached in the volatile memory 1012. It is to be appreciated that the disclosed architecture can be implemented with various commercially available operating systems or combinations of operating systems.

The aforementioned application programs 1032, other program modules 1034, and program data 1036 can include the mobile device roaming system 100, the detection component 102, and the connection component 104 of FIG. 1, the notification component 304, device application component 306, the hand-off component 308, the prediction component 312, components that cooperate with the detection component 102 as shown in FIG. 4, namely, the authentication component 400, the signal strength component 402, the voice quality component 404, and the access point identification component 406. The application programs 1032, other program modules 1034, and program data 1036 can also include the components of the embodiment of FIG. 5, including the mitigation component 506, the failure recovery component 508, the threshold component 510, the user alert interface component 512, the cellular switching component 514, the probing component 516, and the pre-authentication component 518.

A user can enter commands and information into the computer 1002 through one or more wire/wireless input devices, for example, a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, etc.

A monitor 1044 or other type of display device is also connected to the system bus 1008 via an interface, such as a video adaptor 1046. In addition to the monitor 1044, a computer typically includes other peripheral output devices (not shown), such as speakers, printers, etc.

The computer 1002 can operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which can connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which can also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device roaming system, comprising:
a detection component configured to detect switchover of wireless voice communications from an access point of a controller to a different access point of a different controller, the controller and the different controller are part of a wireless packet communications infrastructure;
a connection component configured to switch the wireless voice communications back to the access point of the controller based on failure of the wireless voice communications to occur via the different controller;
a voice quality component configured to maintain voice communications quality based on a packet interval limited to a maximum value, and facilitate switchback to the access point of the controller by the connection component in response to detection of an irregular packet arrival interval; and
a microprocessor configured to execute computer-executable instructions stored in memory associated with the detection component, the connection component, and the voice quality component.

2. The system of claim 1, further comprising a notification component configured to notify a device application that failure of the voice communications is imminent.

3. The system of claim 1, further comprising a hand-off component configured to cooperate with the connection component for switching the mobile device to a cellular network.

4. The system of claim 3, wherein the hand-off component is one of an automatic hand-off component or a user-actuated hand-off component.

5. The system of claim 1, wherein the detection component comprises an authentication detection component configured to detect an attempted authentication to the different access point of the different controller.

6. The system of claim 1, wherein the detection component further comprises a signal strength component configured to detect a low signal strength threshold of the access point of the controller.

7. The system of claim 1, wherein the detection component further comprises a voice quality component configured to determine whether packets arrive at intervals sufficient to maintain voice communications.

8. The system of claim 1, wherein the detection component further comprises an access point identification component configured to identify the access point of a controller and the different access point of the different controller.

9. The system of claim 1, further comprising a prediction component configured to map a location distribution of access points over a commonly-travelled mobile communications area.

10. A mobile voice communications system, comprising:
a mobile device configured to exchange voice communications with a first access point controller, the first access point controller connected to a WiFi infrastructure;
a detection component of the mobile device configured to detect a roam attempt from the first access point controller to a second access point controller, the second access point controller connected to the WiFi infrastructure, the detection component comprises a voice quality component configured to maintain voice communications quality based on a packet interval limited to a maximum value, and facilitates switchback to the first access point controller in response to detection of an irregular packet arrival interval;
a mitigation component of the mobile device configured to maintain voice communications in response to a failure of roaming to the second access point controller; and
a microprocessor configured to execute computer-executable instructions stored in memory associated with the mobile device, detection component, voice quality component, and the mitigation component.

11. The system of claim 10, wherein the mitigation component further comprises a failure recovery component configured to restore the wireless voice communications to the first access point controller upon failure of the roaming to the second access point controller.

12. The system of claim 11, further comprising a threshold component of the mobile device configured to detect a predetermined threshold of voice communications characteristics and trigger a notification in response restoring wireless voice communications to the first access point controller.

13. The system of claim 10, wherein the mitigation component further comprises one of:
a user alert interface component configured to solicit user interaction;
a cellular switching component configured to switch the voice communications to a cellular network; or
a probing component configured to probe other access points attached to the first access point controller.

14. A wireless communications method, comprising:
exchanging voice communications between a mobile terminal and a first access point controller connected to a wireless packet communications infrastructure;
roaming the voice communications from the first access point controller to a second access point controller;
performing a mitigation operation to maintain the wireless voice communications following a failure of the roaming to the second access point controller; and
maintaining voice communications quality based on a packet interval limited to a maximum value by facilitating switchback to the first access point controller in response to detection of an irregular packet arrival interval when roaming the voice communications to the second access point controller; and
configuring a processor to execute instructions stored in memory associated with the acts of exchanging, roaming, performing and maintaining.

15. The method of claim 14, wherein performing the mitigation operation comprises switching the wireless voice communications back to the first access point controller.

16. The method of claim 14, wherein performing the mitigation operation comprises handing off the voice communications to a cellular network.

17. The method of claim 14, wherein performing the mitigation operation comprises probing for other access points managed by the first access point controller.

18. The method of claim 14, wherein performing the mitigation operation is preceded by detecting a signal threshold indicative of characteristics insufficient to maintain voice communications.

19. The method of claim 18, wherein detecting comprises detecting at least one of low signal strength or irregular packet arrival interval.

20. The method of claim 14, further comprising mapping a location distribution of access points over a commonly-travelled mobile communications coverage area and predicting roam to the second access point controller.

* * * * *